July 4, 1967     F. A. AXELSSON     3,328,836
FOAM PANEL MAKING APPARATUS
Filed July 19, 1965                           6 Sheets-Sheet 1

INVENTOR.
FOLKE A. AXELSSON
BY
ATTORNEYS

INVENTOR.
FOLKE A. AXELSSON
BY
Price & Heneveld
ATTORNEYS

July 4, 1967     F. A. AXELSSON     3,328,836
FOAM PANEL MAKING APPARATUS
Filed July 19, 1965     6 Sheets-Sheet 3

INVENTOR.
FOLKE A. AXELSSON
BY
ATTORNEYS

July 4, 1967 F. A. AXELSSON 3,328,836
FOAM PANEL MAKING APPARATUS
Filed July 19, 1965 6 Sheets-Sheet 4

INVENTOR.
FOLKE A. AXELSSON
BY
ATTORNEYS

July 4, 1967  F. A. AXELSSON  3,328,836
FOAM PANEL MAKING APPARATUS

Filed July 19, 1965  6 Sheets-Sheet 5

INVENTOR.
FOLKE A. AXELSSON
BY
ATTORNEYS

July 4, 1967  F. A. AXELSSON  3,328,836
FOAM PANEL MAKING APPARATUS
Filed July 19, 1965  6 Sheets-Sheet 6

INVENTOR.
FOLKE A. AXELSSON
BY
ATTORNEYS

United States Patent Office 3,328,836
Patented July 4, 1967

3,328,836
FOAM PANEL MAKING APPARATUS
Folke A. Axelsson, 1604 Sheldon Road,
Grand Haven, Mich. 49417
Filed July 19, 1965, Ser. No. 473,152
3 Claims. (Cl. 18—4)

This is a continuation-in-part application of my co-pending application entitled Panel Forming Apparatus, filed Sept. 20, 1963, Ser. No. 310,370 and assigned to the assignee herein.

This invention relates to apparatus for production forming laminated sandwich panels having an expanded foam plastic core, and more particularly relates to such apparatus for achieving low density panels with excellent bonding.

To fabricate preformed high pressure foam core sandwiches on an economical mass production basis has heretofore been extremely difficult. One reason is because of operational handling difficulties involved with the large initial pressure exerted by the high pressure, chemically reacting foaming material, and the subsequent lesser, but still substantial varying pressure during curing. These factors result in difficulty, during production, of maintaining the desired product configuration and dimensional tolerances while still obtaining substantial product output.

A preferred method of forming the foam resin core is to inject the uncured, unreacted resin between spaced panel plates, simultaneously with injection of an expanding agent, preferably a refrigerated pressurized Freon liquid. The warmed, expanding, vaporizing Freon causes cellular formation of the resin with expansion to fill the core space.

The inventor herein has devised a novel, mobile, pressure mold car and press apparatus for forming foam panels that eliminates the problems indicated above, this structure being described and claimed in the above identified co-pending application.

This novel equipment achieves a relatively high mass production rate of panel fabrication. Since, however, the equipment extends many yards in length, and manual production operations are performed along portions of its length by workers, it has been found that timing between the operational stages varies considerably to create production control problems. Also, varying ambient conditions accentuate the production difficulties.

During high rate production of these foam core panel sandwiches, to obtain completely, thorough, tenacious bonding over both of the sandwich sheet faces is a constant concern since failure of bonding at one small area can cause scrapping of the entire panel.

Experience has shown that in a normal production run, as the atmospheric and temperature conditions change and as the timing between operational stages of the production line changes, some panels will have excellent bonding, while subsequent panels exhibit definite zonal bonding weaknesses.

Another important consideration in forming these foam core panels is the importance of obtaining a very low density foam for optimum insulation characteristics and low weight. This enables use of a smaller amount of resin in each panel, thereby creating a significant saving because the resin ingredients are relatively expensive. The amount of resin is one of the two most significant economic factors determining whether sandwich production will be profitable or not. A second economic factor is the production rate of sandwich formation on the equipment. The third factor is the scrap rate due to faulty bonding or dimensional variations. Actual operation has proven the time saving effectiveness of the inventor's production equipment. The problem encountered with this equipment is that of constantly retaining excellent bonding qualities.

Careful study and evaluation of the process during formation on this equipment has shown that a natural phenomenon occurring with foam expansion causes bonding conditions to be at a critical state so that, if everything moves smoothly along the system, good bonding occurs, but if the assembly conditions or the ambient conditions change, the degree of bonding becomes unpredictable. Specifically, the vaporization of the blowing agent, in its heat absorption process, creates a marked cooling action on the sandwich plates, especially if these are of sheet metal. Moreover, the cooling is not uniform over the sheets so that excessive cooling occurs in some areas. These cool portions have a tendency to poor bonding with possible subsequent release of the cured foam from the plate surface.

Therefore, if other factors occur during production to supplement the cooling action and detract slightly more from the bonding capacity, the cumulative effect causes lack of bonding. On the other hand, if other conditions are all at an optimum, the cooling action is the only one detracting from optimum bonding conditions so that bond formation is sufficient to pass quality tests.

It is an object of this invention to provide a production line foam core panel forming apparatus that is not only capable of allowing fabrication of panels at a rapid production rate and dimensional tolerances by the use of unique conveyorized mold cars, but which also simultaneously enables control over conditions which affect bonding action in the operation.

It is another object of this invention to provide panel forming apparatus that achieves not only improved bonding, but also a lower density panel which requires substantially less resin for its formation. This, therefore, lowers the total cost of basic materials markedly, while simultaneously achieving a higher quality, low density product at a high production rate. Therefore, both quality and quantity are optimized, rather than one being sacrificed for the other.

These and several other objects of this invention will become apparent upon studying the following specification in conjunction with the drawings in which.

The apparatus illustrated is for the high pressure formation of panel-type laminated sandwiches having a low density, foamed plastic core of relatively rigid foam plastic, and a pair of overlying sheet elements. The sheets may be of sheet metal such as steel, aluminum (or etched stainless steel), or of Formica, Masonite, or other suitable metallic materials, pressed fibrous materials or synthetics. The particular sheet material is not critical.

The completed laminates are normally of a thickness of one to three inches, for example, and may be rectangular in cross section and generally flat, or alternatively formed to particular curvatures and configurations. For purposes of convenience the inventive apparatus will be described with respect to a rectangular panel which is flat. The average such panel is several feet in width, e.g. about four feet and several feet in length, e.g. about eight feet. These, of course, are only representative dimensions and configuration features for illustrative purposes.

Figure 1:
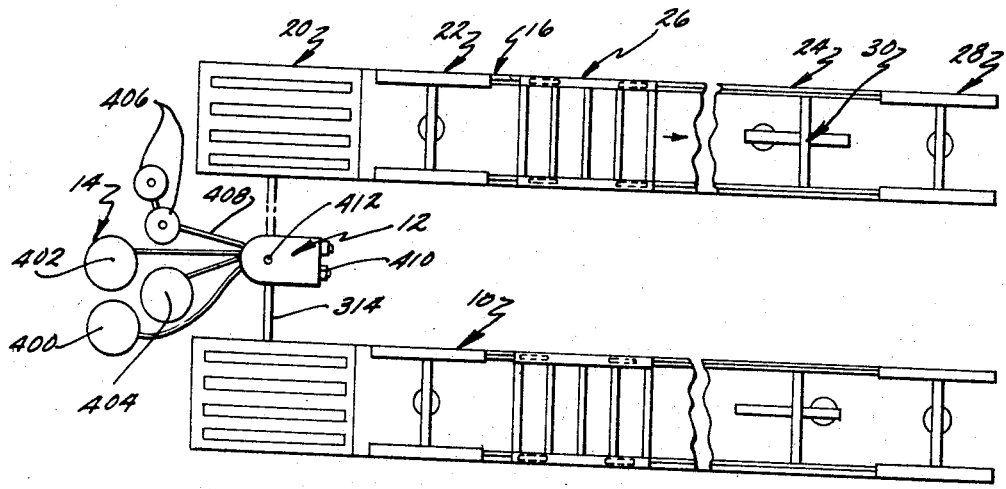
FIG. 1 is a plan diagrammatic view of the forming apparatus arranged in a pair of production lines.

Referring now specifically to the drawings, the apparatus as illustrated in FIG. 1 includes a common injector head 12, chemical reactant pressure vessels 14 (illustrated diagrammatically), and a plurality, here two, high pressure molding production lines 16 and 18.

Figure 2:
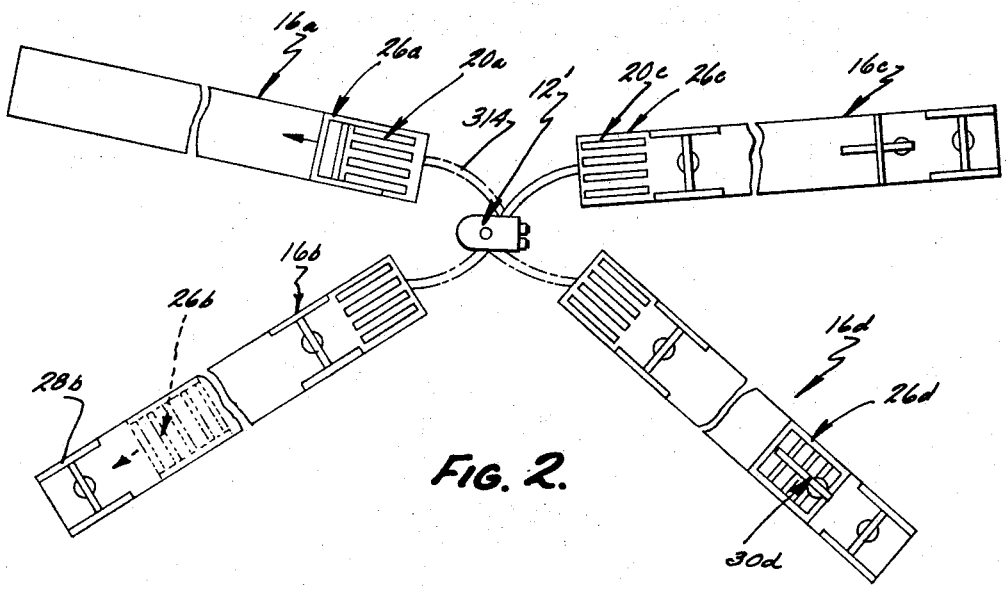
FIG. 2 is a plan diagrammatic view of the apparatus of a plurality of lines arranged in generally radial fashion around a common injection head.

In FIG. 2, the injection head 12′ accommodates a plurality of generally radially oriented production lines 16a, 16b, 16c and 16d. These are representative of the multiple line-single injection head combination used to advantage with the invention. Such arrangement is more specifically set forth in pending United States patent application entitled Injection Foam Molding System, filed Sept. 20, 1963, Ser. No. 310,210 and assigned to the assignee herein.

Each of the production lines of the plurality normally employed comprises an elongated conveyorized line including several distinct portions. Each comprises a stationary, pressure restraining or retaining means 20, an adjacent elevator 22, an elongated conveyor 24 including two sets of conveyor tracks one above the other, and adapted to convey the movable mold retaining cars 26, a second elevator 28 at the opposite end of the line, and a mold car assembly area including a shiftable hoist 30 for disassembling and reassembling the restraining cover means and base support of the mold cars. Operably mounted in this assembly zone are upper and lower radiant heat sources 25 and 27, respectively, for pre-heating particular portions of the mold cars.

Each of these conveyor lines supports several of the novel cars 26. For purposes of convenience, only one car is shown in detail in FIG. 1. The mobile cars 26 move along the tracks into and out of restraining means 20 on the upper and lower tracks.

Relatively high speed production is achieved. This is due to several features. One feature is the two stage restraining means for the mold, with the car itself forming a mobile restraining means for the curing article in the mold, and the stationary restraining means 20 being a reinforcing, temporary retainer for the individual cars during the initial chemical reaction of the foaming plastic. A second is the conveyor system which extends directly into the stationary restraining means 20 and enables the individual mobile restraining means or cars to move into and out of the temporary restraining means for initial reaction therein and subsequent curing on other portions of the conveyor.

Each of the individual cars 26 includes a base 40 (FIG. 6 and FIG. 3), and an attached pressure cover hold-down element 42 held in a spaced relationship from base 40 by a plurality of upright spacers 44 on opposite sides of the car. The hold-down is clamped tightly to the base against these spacers in this particular spaced relationship by clamping means. The clamping means as shown comprises a plurality of flanges on opposite sides of cover 42, a plurality of flanges 48 on the opposite sides of base 40, and threaded tie bars 50 (FIG. 3) extending therebetween. The tie bars or tension elements may be studs employing cooperative nuts.

Both the bed and the pressure cover of this restraining means are basically rectangular frames formed of metal stock such as steel. The periphery of the construction is interconnected by weldment to a plurality of parallel, spaced steel ribs 54. The base and cover are both rigid and sturdy, so that when clamped together on the edges, are capable of retaining the intermediate mold assembly against pressures of up to about 30,000 p.s.i.

The bed of each car is covered by an element 58 forming a continuous surface. Typically it is a plywood sheet of substantial thickness forming a continuous bed surface for the mold. It is preferably coated with an aluminum sheet for optimum release. The lateral sides of the mold are defined by a pair of uprights such as angle irons 60 and 62 (FIG. 6) secured to mold board 58. The mold also includes front and back fixed bar elements 66 and 68. The four upright surfaces, therefore, define an elongated chamber therebetween. Preferably, a removable bar 70 is spaced from fixed bar 68 by a plurality of short horizontal spacer blocks on tubes 72 for easier disassembly of the mold.

To achieve simplified assembly and disassembly, and to provide an offset on one side of the molded article, one side of the mold includes an elongated rod 76 of rectangular cross section extending along the inner face of angle iron 62. A stepped plate 78 is abutted against and fits over the bar in the mold. The other side includes a pair of angle bars 80 and 82, the specific function of which will be described hereinafter. All of these insert elements are especially suited to the particular edge construction of the panel illustrated. These may be modified, eliminated, or supplemented to achieve other panel edge configurations or junctures.

The mold is enclosed on the top by a second mold board 86, ordinarily of plywood of a substantial thickness. Thus, the two mold boards or platens 58 and 86, and the peripheral elements 60, 70, 62 and 66 define a generally rectangular, substantially flat chamber a few inches in height and several square feet in area for molding.

Normally, the upper mold board 86 is loosely suspended from the upper or cover restraining frame 42 as by a pair of chains 90 on the forward and rearward ends. This enables hoisting of the upper mold board with the restraining cover 42 for disassembly and reassembly with maximum ease and speed.

The upper restraining element 42 includes a generally inverted U-shaped hoist bracket 98 on the top for cooperation with the hook 100 of a conventional hoist 102. This hoist is mounted on an I-beam track 104 which extends longitudinally of the conveyor. The track is mounted to overhead support 106 which, being of inverted U-shaped configuration, includes a cross beam and a pair of spaced support legs extending downwardly on opposite sides of the production line conveyor.

Mounted to the track 104 by transverse, depending cross brackets 105 is an upper radiant heat source means 25. This may include four individual elongated infra-red heat lamps, two on each side of the tracks, end to end. These straddle track 104 to allow hoist 102 to move therebetween as desired. These lamps include reflector shields directed downwardly and slightly inwardly to cover the track width. The radiant heat is directed toward the individual mold cars, and specifically toward the upper surface 58 of the mold car base or bed upon which the lower metal sheet to form the sandwich is placed.

Spaced longitudinally along the tracks from the upper source is a lower radiant heat source means 27. For convenience, the lower source is placed between the tracks. It may comprise two end-to-end sources. These are directed upwardly to radiate heat against the undersurface of upper mold board 86. The sources are all infra-red bulbs operated from a common electrical outlet. Longitudinal spacing allows simultaneous heating of both mold car surfaces for a brief time interval subsequent to mold disassembly and prior to reassembly.

Figure 3:
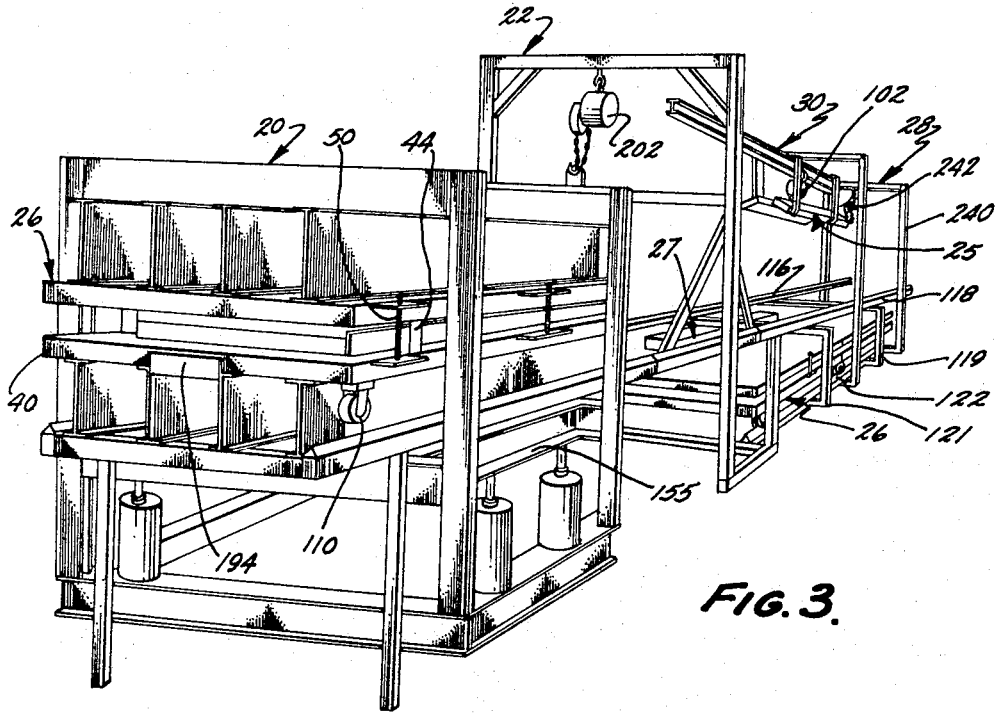
FIG. 3 is a perspective view of one of the production line setups of the apparatus.
Figure 5:
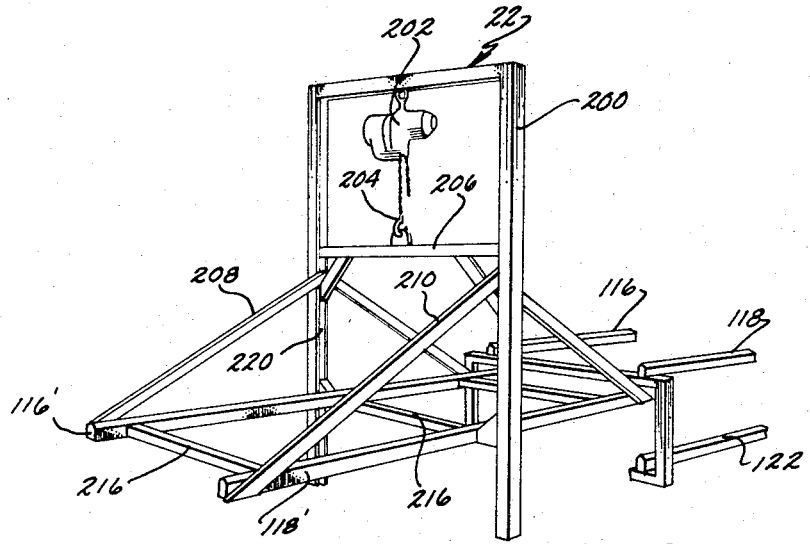
FIG. 5 is a fragmentary perspective view of an elevator in the novel apparatus.

The bed of the restraining car has a plurality of at least four depending roller wheels 110 mounted fore and aft on brackets 112 to the bottom and side edges of the car. These rollers are configurated with a peripheral groove to interfit with the pair of upper tracks 116 and 118 or with the pair of lower tracks 120 and 122 (FIGS. 3 and 5).

The stationary restraining means 20 includes a fixed upper frame and a vertically shiftable lower frame. Each of these frames in essence comprises a jaw of a vertical restraining means. The upper jaw is formed by a series of spaced, adjacent, elongated, parallel, I-beams 140 welded to and suspended from a pair of overhead, generally inverted, U-shaped mounts 142 and 144. These mounts are supported on suitable interconnected I-beams or the equivalent 146 attached to the floor. The lower jaw of this restraining means likewise is formed of a plurality of spaced, parallel I-beams 150. These are attached to a pair of spaced underlying transverse supports 152 and 154. These are interconnected by cross ties 155.

The ends of these transverse supports interfit in the vertical slots 156 (FIG. 9) of the I-beams forming the vertical legs of supports 142 and 144. The opposite ends of transverse beams 152 and 154 are, therefore, guided during vertical reciprocal movement. Mounted under each of these beams 152 and 154 is a pair of fluid cylinders. Thus, fluid cylinders 160 and 162 hoist and lower beam 152, while cylinders 164 and another (not shown) simultaneously hoist beam 154. These move the upper surface of I-beams 150 (forming the lower jaw) to positions above and below the level of the conveyor tracks extending into the restraining means. Only one set (here the upper set) of conveyor tracks 116 and 118 extend into the restraining means between the two jaws.

The upward movement of the lower jaw is limited by spacers 170 (FIG. 9) placed in the channels of the I-beam vertical support legs. These upper ends abut the cross members of support 142 or 144, and the lower ends abut beams 152 and 154. For these reasons, initial compression applied to the movable restraining car and its mold is just sufficient to force the elements into tight engagement and to grip the car. The cylinders provide a reaction force against any tendency of the car to expand under pressure of the reacting chemicals during foaming. Consequently, it will be seen that the compression restraining means, in both its stages, provides reaction pressure or restraint against any tendency of the mold to expand. This is true of the car because of spacers 44 (FIGS. 3, 6 and 7) which enable the upper and lower car restraining elements to grip the mold but not compress it excessively, and is true with respect to this fixed or stationary restraining means 20 because of the plurality of spacers 170.

The ends of tracks 116 and 118 may be suitably vertically supported by legs 190 as necessary, and may be interconnected by a cross piece 192. The remainder of the upper tracks 116 and 118 is mounted upon and supported by a plurality of spaced brackets 119 and 121. The lower tracks are also affixed to these brackets to maintain their parallel aligned relationship. Also, a suitable car stop 194 is provided on the lower bed of the stationary restraining means to prevent a car being wheeled into the restraining means from going too far.

The hydraulic cylinders 160 and 162 are capable of restraining large forces such as pressures of 80,000 p.s.i. on a panel several square feet in area. Conceivably, the cylinders may be substituted by equivalent mechanical restraining means capable of being moved from a lowered condition to an elevated position adjacent the car. Also, within the broader aspects of this invention, the upper jaw may move instead of the lower jaw. However, it is preferable to shift the lower jaw upwardly since this elevates the car above its track, thereby removing the wheels from the track as illustrated in FIG. 3. This eliminates the possibility of the application of pressure between the wheels and tracks. Thus, the upper surfaces of the lower I-beams 150 are purposely shifted from a position below these tracks, to a position above the tracks in the restraining condition.

In the preferred form of the apparatus, a track type elevator (see FIG. 5) 22 is located adjacent the stationary restraining means and in alignment with the conveyor tracks between the jaws. This elevator includes an overhead, inverted, generally U-shaped support 200 anchored on its lower ends. Its cross beam extends across and above the elevator tracks. Mounted beneath and to this cross beam is a conventional power hoist 202. To the hook 204 of the hoist is attached a cross beam 206. Suspended from this beam are two pairs of spaced diagonal supports 208 and 210. To the ends of these diagonal supports are mounted elevator track sections 116' and 118'. These track sections, when raised, form a part of the upper tracks 116 and 118, and when lowered, form a part of the lower tracks 120 and 122. The track sections are suitably interconnected by cross braces 216 to retain their alignment with these upper and lower tracks. Vertical supports 220 extending from beam 260 down to track sections 116' and 118' are interfitted in the grooves of the I-beams forming the vertical legs of the U-shaped support 200. Thus, the elevator is guided vertically during its lowering and raising.

A second elevator 28 also like elevator 22 illustrated in FIG. 5, is provided at the opposite end of the conveyor line. The elevator 28 thus includes an inverted generally U-shaped overhead support 240, a hoist 242 suspended therefrom (FIG. 3) and track sections like those illustrated in FIG. 5.

Adjacent the second elevator 28 is an unloading and reassembly station 30. This station (FIG. 6) as described previously, includes support 106, hoist track 104, and hoist 102, to disassemble and reassemble the components of the mobile cars.

Figure 6:
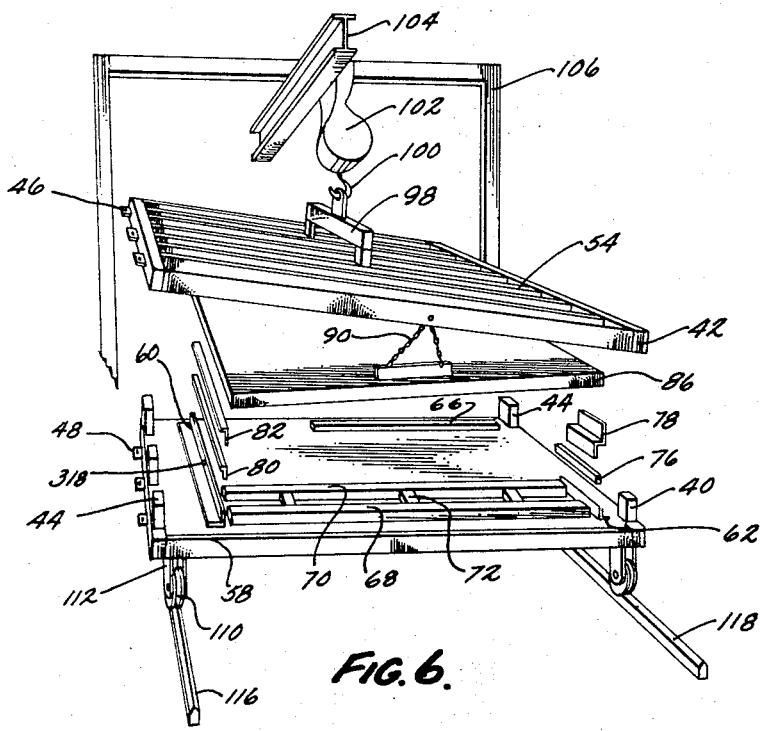
FIG. 6 is a perspective exploded view of one of the mold assemblies on a conveyorized car.
Figure 7:
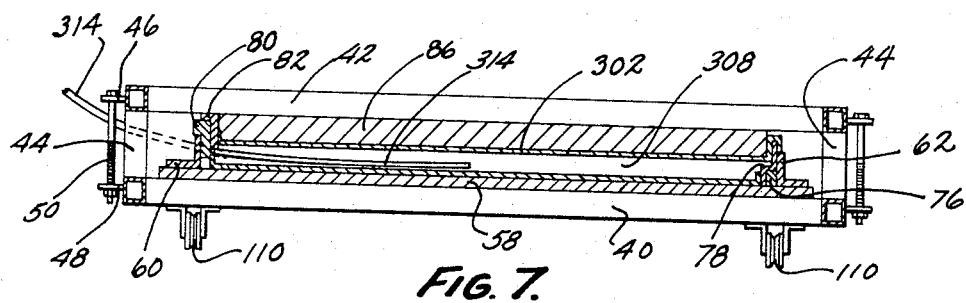
FIG. 7 is a sectional view of the assembled mold on the car illustrated in FIG. 6.

When each of the mold cars is assembled, it assumes the form illustrated in FIG. 7. The restraining base 40 on wheels 110 has attached thereto, vertically spaced thereabove, the upper pressure retainer cover 42. As explained previously, these are spaced upright spacers 44 at the opposite sides of the elements and secured together by tie bolts 50 extending between flanges 46 and 48. Supported on and attached to the cross ribs of bottom 40 is the mold board 58. Attached to this mold board are the side angle irons 60 and 62 as well as end elements 66 and 68 (FIG. 6). The lower sheet metal or equivalent layer 300 forming the bottom of the finished panel is supported on this mold board 58, and retained within the confines of the mold assembly against bar 76 and offset Z-shaped element 78 on one side, and against inverted, L-shaped elements 80 and 82 on the opposite side. The ends of the panel are retained between fixed bar 66 and removable bar 70. The upper layer 302 which forms the opposite skin of the completed panel (FIG. 8) 310 is held in a spaced parallel relationship to bottom layer 300. Its hooked flange 306, which is turned downwardly, hooks over the upwardly extending plate 78. It also rests upon end members 66 and 70. Its opposite side from flange 306 is abutted against plate 82. The top mold board 86 rests upon this upper layer. The completed assembly is not compressed excessively, but is merely retained in tightly engaged, sealed relationship to defined an internal cavity 308 into which foam 312 (FIG. 8) is later injected. It is injected with a flexible tube 314 (FIGS. 7 and 4) which extends into opening 318 (FIG. 6) in the side of each mold assembly to communicate with chamber 308.

Figure 13:
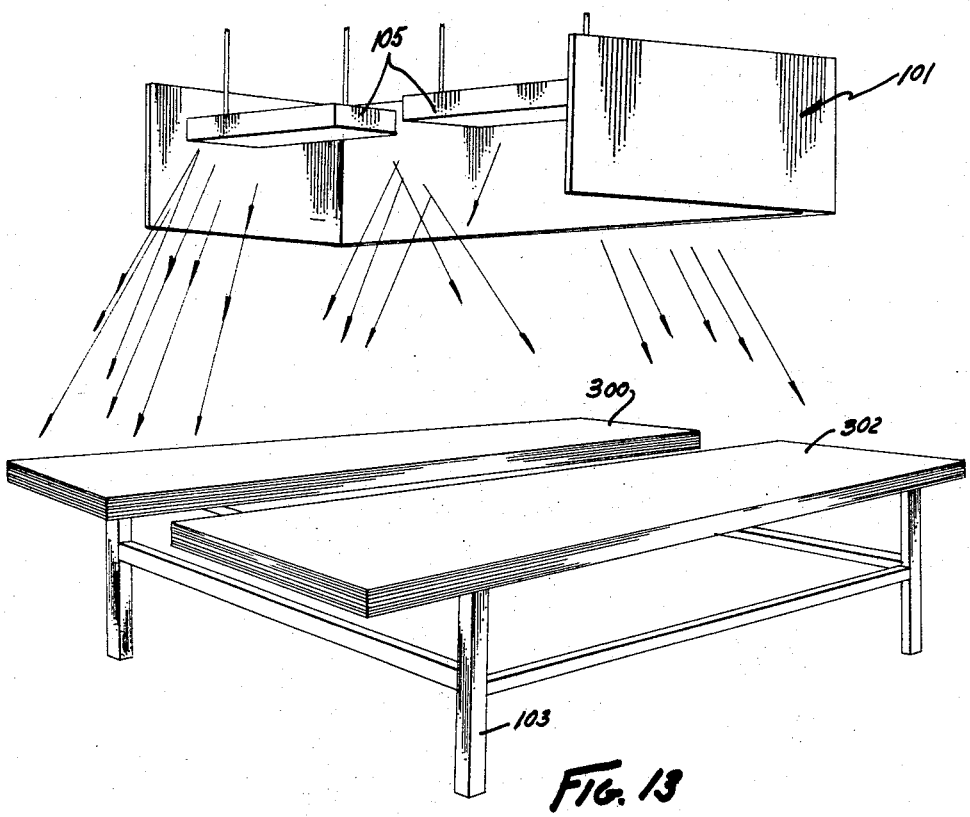
FIG. 13 is a perspective view of supplemental sheet heating apparatus employed with the forming apparatus.

Adjacent this assembly zone is plate heating apparatus 101 (FIG. 13). The plates 300 and 302 to form the spaced elements of the finished sandwiches (FIG. 8) are stacked on supports 103 beneath shielded, overhead, radiant heat sources 105. The topmost plate, is therefore, heated for the time period between assembly of two successive mold cars, one being used from each stack for each mold assembly.

*Operation*

Figure 8:
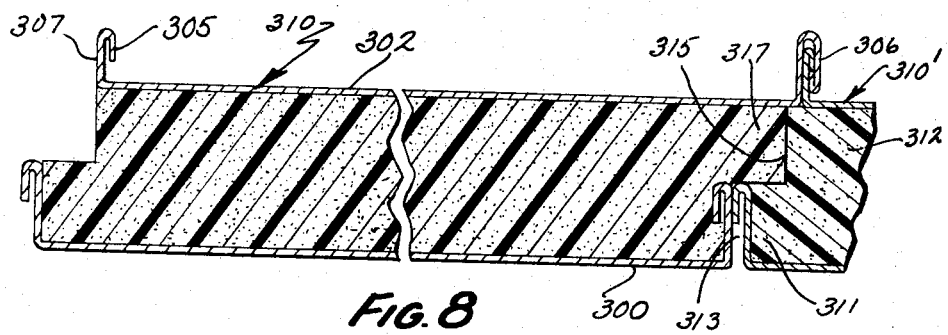
FIG. 8 is a sectional view of the completed foam core, laminated product formed with this apparatus.

To achieve the high pressure, low density, stiff foam panel illustrated in FIG. 8, having an exceptionally low density, and excellent bonding to the enclosure sheets, the following sequence is performed.

When the complete apparatus has been set up, a plurality of the mold cars is used on each conveyor line. The first mold car is assembled at station 30 on upper tracks 116 and 118. Each includes the elements illustrated in exploded form in FIG. 6 in the manner illustrated in the assembled form in FIG. 7. Bar 76 is abutted against the inside face of angle iron 62. and offset plate 78 is rested upon and abutted against this bar so that its upper flange extends upwardly above angle iron 62. Then inverted L-shaped bar 80 is positioned against and on top of L-shaped bracket 60 on the opposite side of the mold. This assembly is made with the mold car bed beneath heat source 25 to simultaneously heat the upper surface 58 to at least 100° F., and preferably higher. Temperatures from 110°–130° F. are preferred. In the meantime, the cover hold-down and the suspended upper mold board are suspended over heat source 27 by hoist 102. Stacks of sheets 300 and 302 are also simultaneously heated.

Then one of the heated lower sheet metal elements 300 is removed from its stack and inserted inside the mold to rest upon the heated bottom mold surface 58. It abuts against plate 78 on one side, and L-shaped bracket 80 on the opposite side. Then, the second L-shaped bracket 82 is inserted so that its lower end abuts and holds down the upwardly projecting flange on lower layer 300. The heated upper sheet is then removed from its stack and mounted on the mold so that its downwardly turned flange 306 fits over the top edge of element 78, and the opposite side abuts against L-shaped bracket 82. Then either the upper mold board and hold-down are shifted along the trolley to be over the mold car base, or alternatively, the mold car base is moved beneath the upper elements. The top mold board 86 is lowered, along with top frame 42 of the mobile restraining means. Tie bolts 50 are then tightened between the mounting flanges on the sides to cause upper frame element 42 to be tightly held down on spacers 44. The unit with its heated, closed interior is then moved down the conveyor tracks 116 and 118 across the elevated conveyor track sections 116′ and 118′ of elevator 22, and into temporary retaining means 20.

Figure 4:
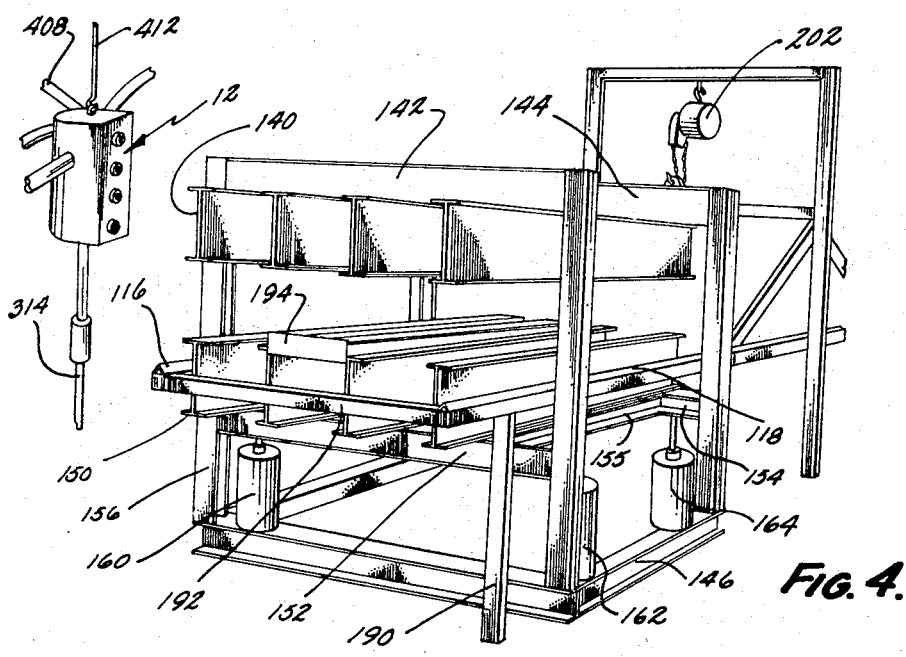
FIG. 4 is a perspective view of the stationary pressure retention zone of the apparatus.
Figure 9:
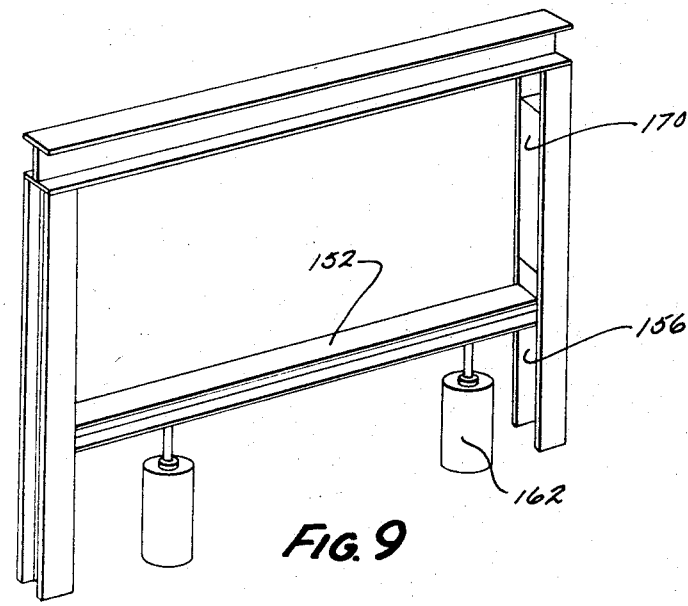
FIG. 9 is a fragmentary sectional view of one end of the stationary retention means of the press.
Figure 10:
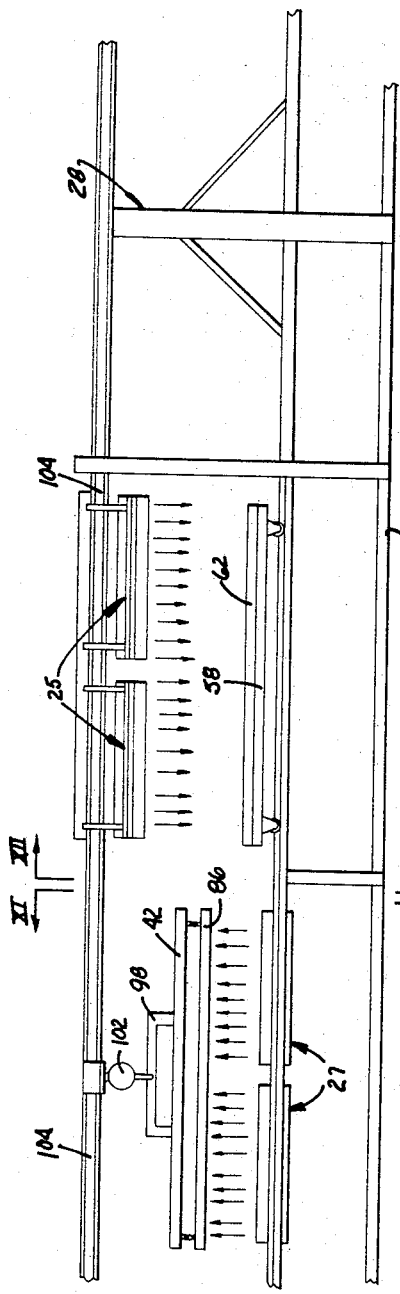
FIG. 10 is a fragmentary side elevational view of the mold car assembly area of the forming apparatus.
Figure 12:
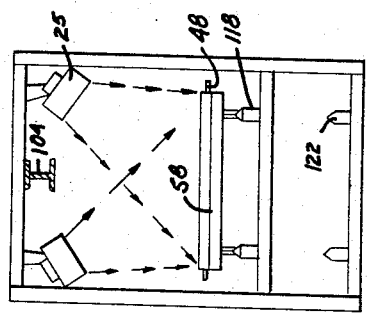
FIG. 12 is a sectional elevational view taken on plane XII—XII of FIG. 10.
Figure 11:
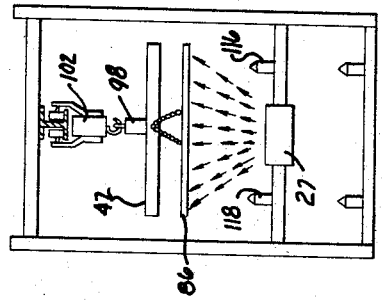
FIG. 11 is a sectional elevational view taken on plane XI—XI of FIG. 10.

As the car moves into the confines of the restraining means, the lower jaw must be in a lowered condition so as not to interfere with the entry of the car. The car moves in until it abuts stop flange 194 (FIG. 4). Then cylinders 160, 162 and 164 or their equivalent, are actuated to elevate the lower jaw of the restraining means and hoist the car and mold off the conveyor tracks as illustrated in FIG. 3. When the mechanism has been hoisted sufficiently to abut the top of the car against I-beams 140, spacer elements 170 abut supports 142 and 144 and beams 152 and 154 (FIGS. 9 and 4). The unit is now ready to be injection molded.

The individual chemical reagents for forming the selected foam plastic are retained in suitable pressure vessels 14. Thus, when using an expanded polyurethane foam in the panel, the different reagents are mixed first prior to injection. Vessels 400, 402 and 404 can contain a polyether resin, an isocyanate, and a catalyst, for example, and the pressurized gaseous expanding agent, such as Freon, is maintained in the pressure tanks 406 for mechanical expansion of the foam. These are all simultaneously injected in the necessary quantity relationships through flexible hoses 408 into the mixing and injector head 12.

The head itself is controlled by suitable switching equipment 410 on a face thereof. The head itself is suspended on element 412 from a suitable overhead support so that it can be pivoted about and shifted slightly from place to place. Its structure is preferably like that in patent application Ser. No. 438,295 entitled Foam Injection Head, filed Mar. 9, 1965, and assigned to the assignee herein.

Since the mixing ejection head is suspended adjacent the stationary restraining means of the several production lines 16 and 18 in FIG. 1 or 16a, 16b, 16c and 16d in FIG. 2, it can be utilized to accommodate them successively.

A flexible hose 314 is attached to and extends out of the bottom of the ejection head to carry the mixed, but as yet unreacted chemical reagents to the mold. This hose is inserted through an opening in the side of each mold, as illustrated in FIG. 7, so that, when the ejection head is actuated, the mixed unreacted reagents are injected into molding space 308 (FIG. 7) to fill it. The hose is flexed in an arc inside the mold to obtain even distribution.

An initial time lag is caused by delayed reaction of the chemical reagents to enable fill before significant pressure reaction. This is achieved in well-known fashion either by controlling the temperature of one or more of the reagents, or by the selection or reagents, or both. Thus, the operator has completely adequate time to fill the space and insert a plug in the opening before reaction begins to any considerable extent.

As the chemical reagents initially react and expand, extremely high internal pressures are created with any high pressure foaming. For example, with high pressure polyurethane foaming pressures in the neighborhood of 80,000 p.s.i. are experienced. The double restraining means of the mobile car restraining means and the stationary restraining means are sufficient to prevent expansion of the mold past outside of its initial confines. Consequently, close dimensional tolerances are maintained in spite of these extremely high pressures.

The expansion is caused by vaporization of the Freon liquid into a gas. This vaporization absorbs substantial heat from the assembly and ingredients. Since the assembly has been heated to an elevated temperature considerably above room temperature, the temperature of the assembly still remains sufficiently high to prevent the occurrence of low temperatures to be a deterrent to thorough, high quality bonding. Therefore, even though temperature differentials occur across the surface area, this does not matter.

Moreover, the density of the resulting foam core is advantageously lower. The foam expands to a greater extent. Related to this result is the additional significant advantage that less resin is used to form the same size panel. For example, in a panel about two inches, by about 3 x 7 feet, almost 3 pounds less of expensive polyurethane resin is needed. The savings is substantial.

After the first few minutes of reaction, for example about four minutes when reacting a rigid polyurethane foam, the initial reacting and expansion pressures in the neighborhood of 80,000 p.s.i. decrease to significantly lower values around 30,000 p.s.i. During the next half hour or so, the pressures slowly subside as the foam cures to a rigid self-sustaining state.

Consequently, the stationary restraining means is purposely expanded and opened after the first few minutes to allow the car to be removed. The structure of the car itself and more specifically its restraining means, maintains the panel in its dimensionally accurate tolerances during the lower pressure curing portion of the cycle.

The car is then pushed out onto track sections 116′ and 118′ of elevator 22. The elevator is lowered to move the car with its curing charge to lower tracks 120 and 122.

The car is then pushed onto the lower tracks and slowly advanced, with several other like cars in various curing stages, to the opposite end of the line. The elevator 22 is then raised again and the next assembled car to be injection molded is advanced into the stationary restraining means. In the meantime, cars with fully cured laminates, having reached the opposite end of the conveyor line are hoisted from the lower conveyor tracks to the upper conveyor tracks by elevator 28. It then is shifted into the unloading and reassembly station 30.

At this station, tie bolts 50 are removed and the assembly is taken apart to break loose the finished cured sandwich, panel-type unit. The mold is then cleaned a little bit as necessary, while the surfaces are heated to elevated temperatures above 100° F., is reassembled, and is advanced down to the stationary restraining means again.

Just after this first car with its mold is removed from the first restraining means, the adjacent car and mold in the adjacent line has reacted sufficiently to be removed from its restraining means. It then goes through the same sequence of events as that just described.

The third car and mold is then treated likewise, and so forth through the plurality of production lines. Consequently, the plurality of cars and molds on each line form a circuit of recirculating cars in various stages of mold preparation, filling, expansion and double restraint, curing, unloading and mold reassembly, while each circuit is sequential to the adjacent one. All, therefore, employ the single mixing and injection head in an extremely efficient manner. This process is shown diagrammatically in FIG. 2, using only one car on each line for purposes of convenience. While car 26a is just leaving zone 20a after being filled and initially reacted, car 26b is being filled by hose 314 in zone 20c. Car 26b with a curing charge is slowly moving along the lower tracks of line 16b to the far elevator 28b, and car 26d is being disassembled at unloading zone 30d for removal of the pre-cured laminate and reassembly of the mold and car.

It has been found that by utilizing this unique apparatus the formed core units can be economically injection molded by the high pressure method under high production conditions, while still accurately maintaining the dimensional tolerance necessary. This enables economical fabrication of such panels for use in mobile homes, animal housing, prefabricated housing, and many other uses. This panel achieves excellent adhesion between the foam and the surrounding layers even though production is rapid. The number of panels scrapped is very low.

Various additional advantages of the apparatus and concepts set forth herein will occur to those in the art upon studying the foregoing preferred form of the invention. Also, it is conceivable that various minor structural modifications can be made in the particular details of construction specifically taught, while still employing the inventive concepts of the invention. Consequently, this invention is not to be limited merely to the particular structure shown, but only by the scope of the appended claims and the reasonably equivalent structure to those defined therein.

I claim:

1. Injection molding apparatus for forming low density, foam core sandwiches comprising: an elongated conveyorized car support means having an initial-reaction, car-retention zone and an assembly-disassembly zone; a plurality of mold cars movable along said car support means from one zone to the other; each of said cars comprising a rigid bed and a rigid hold-down clamped together over a pair of mold platens; said mold platens being spaced by peripheral elements to form a mold cavity; said car-retention zone comprising a pair of pressure jaws shiftable away from and toward one another, and vertically straddling said tracks to grip and hold one of said cars; said assembly-disassembly zone including power means to separate said bed and hold-down; upper and lower radiant heat source means longitudinally spaced in said latter zone; said upper source means being directed downwardly toward the upper surface of the lower platen of a car in said latter zone, and said lower heat source means being directed upwardly toward the under surface of the upper platen of the car in said latter zone.

2. Apparatus for forming foam core sandwich panels, comprising: generally recirculatory track means having a plurality of mold retaining cars thereon; one zone of said track means having a pair of vertically spaced retention jaws shiftable to receive, hold and release one of said cars; each of said cars having releasable cooperative gripping bed and hold-down means and means forming a pair of intermediate, spaced, retaining mold surfaces to receive a pair of sheet elements and hold them in spaced relationship; a second zone of said track means comprising a car assembly zone including hoist means to hoist said hold-down means above said bed; said surfaces being separable with said bed and hold-down means to be exposed; coupling means on said hold-down means engageable with said hoist means; spaced, upper and lower radiant heat supply means along said track means, said lower means being beneath said hoist means and directed upwardly to heat the upper mold surface when hoisted by said hoist means and said upper means being directed downwardly to heat the lower mold surface on said bed.

3. Production apparatus for high pressure injection molding of expandable foaming polymers between a pair of sheets to form a sandwich, comprising: elongated conveyor track means, including an upper track and a lower track, one for handling mold cars containing curing polymer, and the other for returning empty cars; a plurality of mold cars on said tracks; an initial-reaction, pressure-retention zone comprising upper and lower retention jaws vertically astraddle one of said tracks; said jaws being of a size sufficient to entirely receive one of said cars within its confines; said cars being movable between said jaws on said track means; said jaws being shiftable toward each other to grip each car and restrain it against expansion under the high pressure foaming reaction of the polymer, and shiftable away from each other to subsequently release the car for removal; shifting means for said jaws; each of said cars including a mold having upper and lower platens, holding means for retaining said sandwich sheets against said platens, and pressure-retention frame means enveloping said mold for retention thereof against expansion under the effects of internal curing pressures in said mold; a first track-type elevator between said tracks and adjacent said zone, for receiving cars discharged from said retention zone to move them to the curing track; a second track-type elevator at the opposite end of said track means from said first elevator for moving cars to the return track for disassembly of the retention frame and mold to unload the mold, and reassembly of the mold and retention frame to return the car to said zone; an assembly-disassembly zone between said elevators; longitudinally spaced upper and lower radiant heat source means in said latter zone, said upper source means being directed toward the lower mold platen and said lower source means being directed toward the upper mold platen.

No references cited.

ALEXANDER H. BRODMERKEL, *Primary Examiner.*
P. E. ANDERSON, *Assistant Examiner.*